United States Patent
Torres

(10) Patent No.: US 10,632,845 B2
(45) Date of Patent: Apr. 28, 2020

(54) AUTOMATIC SHUTOFF SYSTEM FOR A MOTOR VEHICLE

(71) Applicant: Stephen Torres, Wailuku, HI (US)

(72) Inventor: Stephen Torres, Wailuku, HI (US)

(*) Notice: Subject to any disclaimer, the term of this patent is extended or adjusted under 35 U.S.C. 154(b) by 36 days.

(21) Appl. No.: 16/008,787

(22) Filed: Jun. 14, 2018

(65) Prior Publication Data

US 2019/0381883 A1 Dec. 19, 2019

(51) Int. Cl.
*B60K 28/14* (2006.01)
*B60W 30/09* (2012.01)
*B60G 17/02* (2006.01)

(52) U.S. Cl.
CPC ............. *B60K 28/14* (2013.01); *B60G 17/02* (2013.01); *B60W 30/09* (2013.01); *B60G 2400/82* (2013.01)

(58) Field of Classification Search
CPC .... B60K 28/14; B60G 17/02; B60G 2400/82; B60W 30/09
USPC .......................................................... 701/112
See application file for complete search history.

(56) References Cited

U.S. PATENT DOCUMENTS

| | | | | |
|---|---|---|---|---|
| 5,440,084 A * | 8/1995 | Fuse | ..................... | G01P 15/135 200/61.45 M |
| 5,718,446 A * | 2/1998 | Fuchida | ............. | B60G 17/0164 280/124.157 |
| 8,972,153 B2 * | 3/2015 | Sawada | ............... | F02N 11/0837 123/179.4 |
| 9,108,583 B2 * | 8/2015 | Wanami | ................. | B60K 28/14 |
| 9,776,631 B1 * | 10/2017 | Domeyer | .............. | B60W 30/09 |
| 10,001,361 B2 * | 6/2018 | Yamashita | ............... | G01C 9/08 |
| 2003/0120408 A1 * | 6/2003 | Caruso | ............... | B60R 21/0132 701/45 |
| 2003/0182036 A1 * | 9/2003 | Shal | ....................... | B60G 17/08 701/37 |
| 2005/0082107 A1 * | 4/2005 | Husain | ................... | B62D 5/005 180/402 |
| 2012/0078466 A1 * | 3/2012 | Natori | ................... | B60T 13/662 701/36 |
| 2012/0191313 A1 * | 7/2012 | Miyahara | ............... | B60K 28/14 701/70 |
| 2013/0218433 A1 * | 8/2013 | Matsuno | .......... | B60W 30/0956 701/70 |

(Continued)

*Primary Examiner* — David Hamaoui
*Assistant Examiner* — John D Bailey
(74) *Attorney, Agent, or Firm* — The Iwashko Law Firm, PLLC; Lev Ivan Gabriel Iwashko

(57) ABSTRACT

An automatic shutoff system for a motor vehicle, the automatic shutoff system including a front suspension system disposed at a front portion of the motor vehicle, the front suspension system comprising at least one spring wrapped around at least one arm, at least one sensor disposed on the at least one arm to sense when the at least one spring has been jarred at a predetermined intensity, a curb jump detection system to receive at least one signal from the at least one sensor when the at least one spring has been jarred at the predetermined intensity, and to process the at least one signal to determine whether a curb has been jumped by the front suspension system, and a computer system to receive a signal from the curb jump detection system when the curb jump detection system determines that the curb has been jumped by the front suspension system, and to control a motor to shut off.

2 Claims, 1 Drawing Sheet

(56) References Cited

U.S. PATENT DOCUMENTS

| | | | | |
|---|---|---|---|---|
| 2014/0222306 A1* | 8/2014 | Wanami | ............... | B60K 28/14 |
| | | | | 701/70 |
| 2014/0350811 A1* | 11/2014 | Tamaru | ................. | B60T 7/22 |
| | | | | 701/68 |
| 2014/0353934 A1* | 12/2014 | Yabumoto | ............. | B60G 17/00 |
| | | | | 280/5.515 |
| 2016/0185218 A1* | 6/2016 | Itoo | ...................... | B60K 28/14 |
| | | | | 180/247 |

* cited by examiner

AUTOMATIC SHUTOFF SYSTEM FOR A MOTOR VEHICLE

BACKGROUND

1. Field

The present general inventive concept relates generally to an automatic shutoff system for a motor vehicle.

2. Description of the Related Art

The motor vehicle has become the weapon of choice for many terrorists and hate groups around the world, because a motor vehicle can be used to carry out spontaneous and deadly attacks without any preparation or warning. For example, in August of 2017, at least 14 people were killed when a terrorist-driven white van jumped a curb. Such attacks are impossible to predict or to defend against, and dozens of such attacks have occurred in the last year in Europe, the Middle East, here in the USA, and in other parts of the world.

Also, there are instances when drunk drivers accidentally jump a curb when driving while intoxicated, accidentally killing or injuring pedestrians.

Therefore, there is a need for a device that automatically shuts off an engine of a motor vehicle when it detects that the motor vehicle has jumped a curb.

SUMMARY

The present general inventive concept provides an automatic shutoff system for a motor vehicle.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an automatic shutoff system for a motor vehicle, the automatic shutoff system including a front suspension system disposed at a front portion of the motor vehicle, the front suspension system comprising at least one spring wrapped around at least one strut, at least one sensor disposed on the at least one strut to sense when the at least one spring has been jarred at a predetermined intensity, a curb jump detection system to receive at least one signal from the at least one sensor when the at least one spring has been jarred at the predetermined intensity, and to process the at least one signal to determine whether a curb has been jumped by the front suspension system, and a computer system to receive a signal from the curb jump detection system when the curb jump detection system determines that the curb has been jumped by the front suspension system, and to control a motor to shut off.

The at least one sensor may be calibrated to differentiate between normal jarring of the at least one spring and more intense jarring of the at least one spring.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
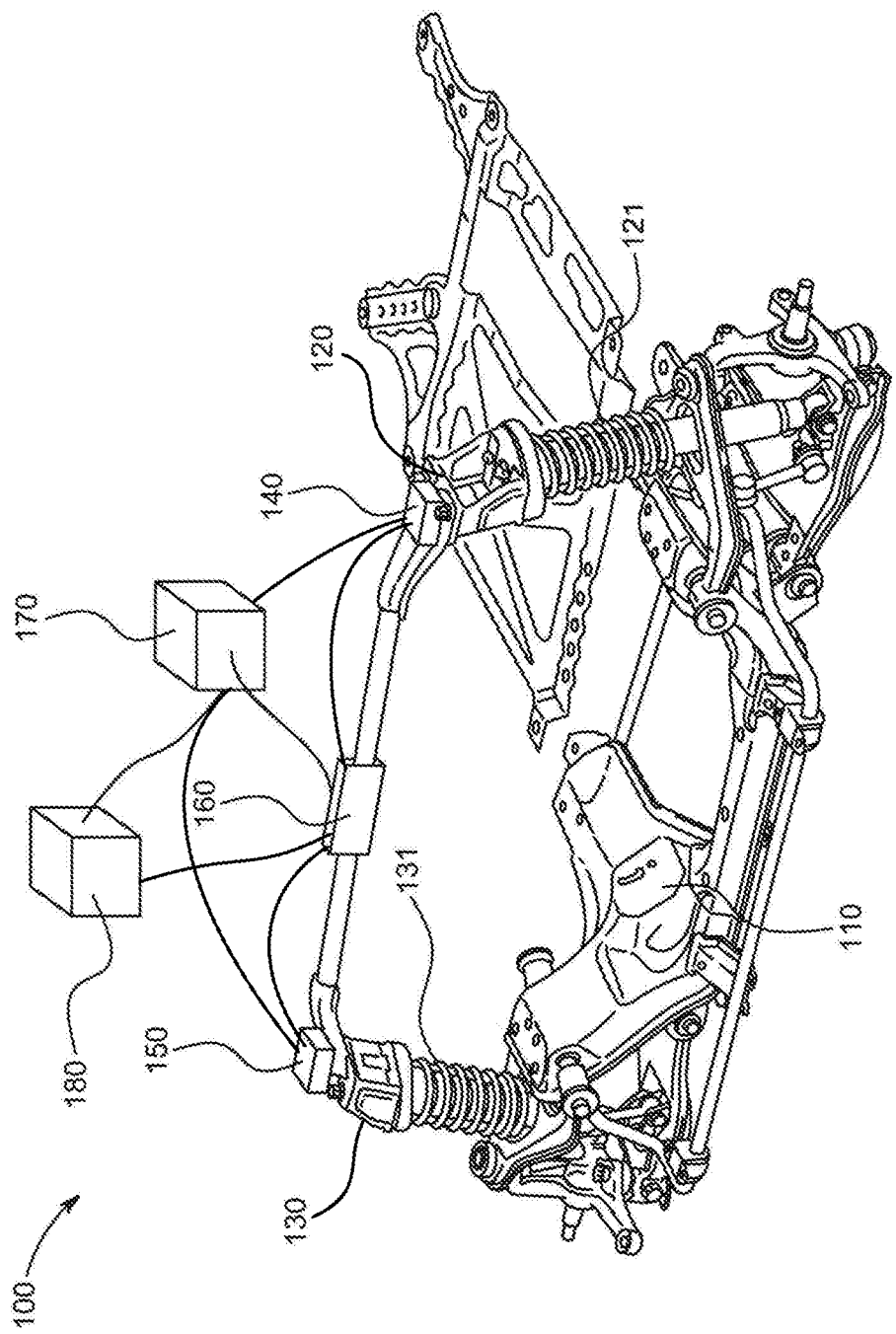
FIG. 1 illustrates an automatic shutoff system for a motor vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates an automatic shutoff system 100 for a motor vehicle, according to an exemplary embodiment of the present general inventive concept.

The automatic shutoff system 100 may include a front suspension system 110, a first sensor 140, a second sensor 150, a curb jump detection system 160, a computer system 170, and a motor 180. The automatic shutoff system 100, and all components thereof, may be disposed within a motor vehicle (not illustrated).

The front suspension system 110 may be disposed at a front portion of the motor vehicle, and may include a first strut 120, a first spring 121, a second strut 130, and a second spring 131. The front suspension system 110 may be a part of a motor vehicle, such as a car, van, truck, motorcycle, etc. The first spring 121 and the second spring 131 may be characterized as shocks for the front suspension system 110. As such, the first spring 121 may be wrapped around the first strut 120, and the second spring 131 may be wrapped around the second strut 130.

The first sensor 140 may be disposed at a top portion of the first strut 120 and/or a first arm, and the second sensor 150 may be disposed at a top portion of the second strut 130 and/or a second arm. As such, the first sensor 140 may detect a forceful movement of the first spring 121, and the second sensor 150 may detect a forceful movement of the second spring 131. In other words, the first sensor 140 and the second sensor 150 may be calibrated to detect when the first spring 121 and the second spring 131, respectively, have been jarred at a predetermined intensity. This calibration will prevent the first sensor 140 and the second sensor 150 from sending signals to the curb jump detection system 160 when the first spring 121 and the second spring 131 experience normal jarring during normal driving of the motor vehicle.

The first sensor 140 and the second sensor 150 may both be connected to the curb jump detection system 160, which may receive a signal from at least one of the first sensor 140 and the second sensor 150, denoting that the front suspension system has jumped a curb.

More specifically, the curb jump detection system 160 may be a computer, such as a CPU, that can be pre-programmed to differentiate between a jumped curb and regular trauma experienced by the first spring 121 and the second spring 131.

As such, when the front suspension system 110 jumps a curb, the first spring 121 and the second spring 131 are jarred significantly, and the first sensor 140 and the second sensor 150 may transmit signals to the curb jump detection system 160 that a curb has been jumped. The curb jump detection system 160 may then process the received signals, and send a signal to the computer system 170.

The computer system 170 may be a vehicle's pre-existing computer system, including a CPU or any other type of processor that can receive signals. When the computer system 170 receives the signal from the curb jump detection system 160, the computer system 170 may send a shutoff signal to the motor 180, such that the motor 180 automatically and instantly stops. As such, the motor vehicle may stop moving when the motor 180 stops.

Accordingly, the automatic shutoff system 100 for a motor vehicle may protect pedestrians from being injured when the motor vehicle jumps a curb where the pedestrians are walking.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An automatic shutoff system for a motor vehicle, the automatic shutoff system comprising:
   a front suspension system disposed at a front portion of the motor vehicle, the front suspension system comprising at least one spring wrapped around at least one strut;
   at least one sensor disposed on the at least one strut to sense when the at least one spring has been jarred at a predetermined intensity;
   a curb jump detection system to receive at least one signal from the at least one sensor when the at least one spring has been jarred at the predetermined intensity, and to process the at least one signal to determine whether a curb has been jumped by the front suspension system; and
   a computer system to receive a signal from the curb jump detection system when the curb jump detection system determines that the curb has been jumped by the front suspension system, and to control a motor to shut off.

2. The automatic shutoff system for a motor vehicle of claim 1, wherein the at least one sensor is calibrated to differentiate between normal jarring of the at least one spring and more intense jarring of the at least one spring.

* * * * *